(12) United States Patent  (10) Patent No.: US 8,256,177 B2
Pfau et al.  (45) Date of Patent: Sep. 4, 2012

(54) IMPACT RESISTANT DOOR SKIN, DOOR INCLUDING THE SAME, AND METHOD OF MANUFACTURING AN IMPACT RESISTANT DOOR SKIN FROM A PRE-FORMED DOOR SKIN

(75) Inventors: James Pfau, Kirkland, IL (US); Stephen Hart, Marango, IL (US); James Bryant, Chicago, IL (US)

(73) Assignee: Masonite Corporation, Tampa, FL (US)

( * ) Notice: Subject to any disclaimer, the term of this patent is extended or adjusted under 35 U.S.C. 154(b) by 340 days.

(21) Appl. No.: 12/401,207

(22) Filed: Mar. 10, 2009

(65) Prior Publication Data

US 2009/0249716 A1  Oct. 8, 2009

Related U.S. Application Data

(60) Provisional application No. 61/035,780, filed on Mar. 12, 2008.

(51) Int. Cl.
*E04C 1/00* (2006.01)
(52) U.S. Cl. ........ 52/309.9; 52/455; 52/784.1; 52/794.1
(58) Field of Classification Search .................. 52/309.9, 52/455, 784.1, 794.1
See application file for complete search history.

(56) References Cited

U.S. PATENT DOCUMENTS

| | | | |
|---|---|---|---|
| 1,694,522 A | 12/1928 | Victor | |
| 4,550,540 A | 11/1985 | Thorn | |
| 4,610,119 A | 9/1986 | Bench, Sr. | |
| 4,630,420 A | 12/1986 | Hagemeyer | |
| 6,119,422 A | 9/2000 | Clear et al. | |
| 6,389,768 B1 | 5/2002 | Gagne et al. | |
| 6,998,359 B2 * | 2/2006 | Bingenheimer | 442/36 |
| 7,185,468 B2 * | 3/2007 | Clark et al. | 52/455 |
| 2002/0091218 A1 | 7/2002 | Ford et al. | |
| 2004/0003559 A1 * | 1/2004 | Minke et al. | 52/309.9 |
| 2004/0035070 A1 | 2/2004 | Chen | |
| 2004/0221531 A1 | 11/2004 | Lynch et al. | |
| 2006/0070347 A1 | 4/2006 | Gupta et al. | |

* cited by examiner

*Primary Examiner* — William Gilbert
*Assistant Examiner* — Patrick Maestri
(74) *Attorney, Agent, or Firm* — Berenato & White, LLC

(57) ABSTRACT

An impact resistant door skin, a door including the same, and a method of manufacturing an impact resistant door skin from a pre-formed door skin are provided. The method includes the steps of providing at least one preformed door skin and applying adhesive to a rear side of the at least one preformed door skin. A fiberglass mesh mat is pressed onto the rear side of the at least one preformed door skin. Then, chopped glass fibers coated with adhesive are sprayed onto the rear side of the at least one preformed door skin using a chopper gun to form a layer of chopped glass fibers on the fiberglass mesh mat. The performed door skin may be a molded door skin having at least one recessed panel formed therein.

6 Claims, 6 Drawing Sheets

IMPACT RESISTANT DOOR SKIN, DOOR INCLUDING THE SAME, AND METHOD OF MANUFACTURING AN IMPACT RESISTANT DOOR SKIN FROM A PRE-FORMED DOOR SKIN

CROSS REFERENCE TO RELATED APPLICATION AND CLAIM TO PRIORITY

This application is based on provisional application Ser. No. 61/035,780, filed Mar. 12, 2008, the disclosure of which is incorporated herein by reference and to which priority is claimed under 35 U.S.C. §119(e).

FIELD OF THE INVENTION

The present invention relates to an impact resistant door skin, a door including the same, and a method of manufacturing an impact resistant door skin from a pre-formed door skin.

BACKGROUND OF THE INVENTION

As known in the art, door facings also known as "door skins" may be secured to a support structure or frame to form a hollow core door. Such facings may be molded from a polymeric material, such as sheet molding compound ("SMC"). SMC may be molded to form a door facing including one or more depressions or grooves, such as one or more square or rectangular depressions. These depressions may define the perimeter of one or more simulated panels. Alternatively, the facings may be flush.

The door facings are secured to opposing sides of the frame, forming hollow spaces between the facings. A core component or material is sometimes used to fill the hollow spaces. Conventional core materials for use in hollow core doors include corrugated cardboard, paper, foam, or fiberboard.

It is sometimes desirable to provide an exterior door that can withstand impacts from flying debris, such as in a high velocity wind zones. Doors are sometimes required to pass certain performance tests, such as those developed by the American Society of Testing Materials (ASTM) which test the performance of doors exposed to the effects of windstorms and impact testing. Doors may also be required to meet regional performance tests within a particular state, such as Florida. The Florida Building Code sets out stringent requirements for building components so that buildings can withstand hurricanes and other severe weather conditions. Impact testing for wind-borne debris is performed on exterior doors and other building components. Sections 1625 and 1626 of the Code provide the specifications for the impact testing. For "large missile" impact tests, a 9 pound two-by-four is projected at the surface of the test specimen at a speed of about 50 feet per second (34.1 miles per hour) using a compressed air cannon. The large missile test is used on building components that will be located less than 30 feet above the ground. In this test, each specimen receives two impacts, one in the center and one in a corner of the specimen. Once the large missile testing is completed, a fatigue load testing is performed on the specimen.

During the fatigue load testing, a cyclic large predetermined pressure load is applied to the test specimen to ensure that the specimen does not detach from its respective mounting. The pressure is applied by a compressed air supply blower during forward test loading periods and reverse test loading periods in which a pressure differential based on a wind velocity of 75 miles per hour is formed across the entry door or building component in a testing chamber. Permanent deformation and the maximum deflection are recorded for each specimen. An exterior door or other building component "passes" these tests if three specimens reject the two missile impacts without penetration and resist the cyclic pressure loading with no crack forming that is longer than 5 inches and wider than $1/16$ of an inch.

The "small missile" impact test includes projecting 30 small steel balls of about half a pound and $5/16$ of an inch in diameter at the exterior building component at different locations at a speed of 130 feet per second (88.6 miles per hour). The "small missile" impact test is performed on building components that will be located more than 30 feet above the ground. Once the small missile impact test is completed, the fatigue load testing is performed by applying the cyclic pressure to determine whether the specimen will detach from its mountings. Permanent deformation and the maximum deflection are recorded for each specimen. An exterior door or other building component "passes" these tests if three specimens reject the small missile impacts without penetration and resist the cyclic pressure loading with no crack forming that is longer than 5 inches and wider than $1/16$ of an inch.

Testing Application Standards (TAS) sections 201-94, 202-94, and 301-94 provide the protocols for the large missile, small missile, and fatigue loading impact tests.

Various attempts have been made to provide a hollow core door that can withstand impact testing. One design provides a hollow core door having a mat disposed within the door cavity and between the opposing door facings. A cementitious material is poured around the mat. Such doors are relatively expensive and difficult to assemble. In addition, they are relatively heavy, and therefore difficult to store, transport and install. Other designs provide for metal door facings. Such doors are also relatively expensive. In addition, they are often less desirable to consumers because they lack aesthetic detail, and may rust and dent.

Conventional impact resistant doors are typically made impact resistant during the manufacturing processes used to fabricate the door skins themselves. Thus, these doors are manufactured specifically to be impact resistant and are then placed on the market. However, consumers have little choice in the variety of doors that can be made high impact resistant. That is, consumers typically have a limited number of options for selecting from among styles and sizes of hollow core doors that are made impact resistant.

Additionally, the manufacture of impact resistant hollow core doors typically requires a substantial amount of equipment and capital, thus making impact resistant doors relatively expensive to manufacture.

Therefore, there is a need for an impact resistant door that overcomes some or all of the above noted problems and disadvantages.

SUMMARY OF THE INVENTION

A method of manufacturing a high impact resistant door skin includes the steps of providing at least one preformed door skin and applying adhesive to a rear side of the at least one preformed door skin. A fiberglass mesh mat is pressed onto the rear side of the at least one preformed door skin. Then, chopped glass fibers coated with adhesive are sprayed onto the rear side of the at least one preformed door skin using a chopper gun to form a layer of chopped glass fibers on the fiberglass mesh mat. The preformed door skin may be a molded door skin having at least one recessed panel formed therein. The fiberglass mesh mat may be contoured to the shape of the molded door skin.

A method of reinforcing a plurality of molded preformed door skins of different styles and sizes includes the steps of applying a first adhesive layer to a rear side of each of the molded preformed door skins. Then, a first continuous fiberglass reinforcement layer is applied on the rear sides of each of the molded preformed door skins so that the first adhesive adheres the first continuous fiber reinforcement layers to the preformed door skins. Chopped fiberglass strands are coated with a second adhesive, and a second non-continuous fiber reinforcement layer is formed on each of the first continuous fiber reinforcement layers by applying the chopped fiberglass strands thereto.

A high impact resistant door skin usable in a hollow core door includes a preformed door skin having at least one recessed panel formed therein. A fiberglass mesh mat is adhered to a rear side of the at least one preformed door skin. The fiberglass mesh mat is contoured to the at least one recessed panel. A layer of chopped glass fibers coated with adhesive is disposed on the fiberglass mesh mat.

An impact resistant door includes a peripheral frame; and first and second door skins secured to opposing sides of the frame. At least one of the skins includes a rectangular sheet of molded hardened polymeric material having first and second opposing major surfaces, a fiberglass mesh mat adhered to a rear surface of the at least one skin so that the polymeric material does not permeate the fiberglass mesh mat, and a layer of chopped glass fibers coated with adhesive disposed on the fiberglass mesh mat.

DETAILED DESCRIPTION OF THE INVENTION

Figure 1:
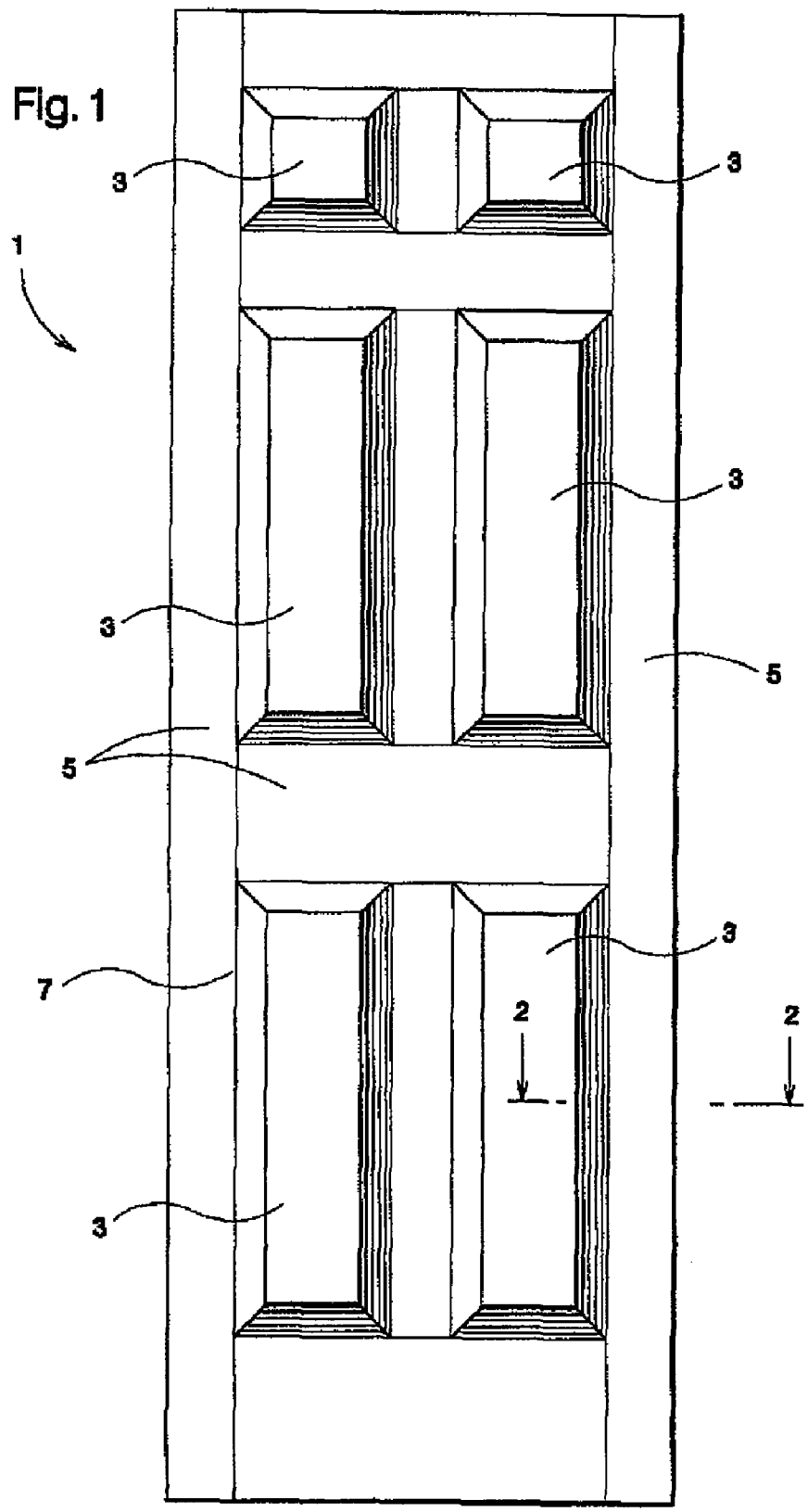
FIG. 1 is an elevational view of an exemplary hollow core door.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

Figure 2:
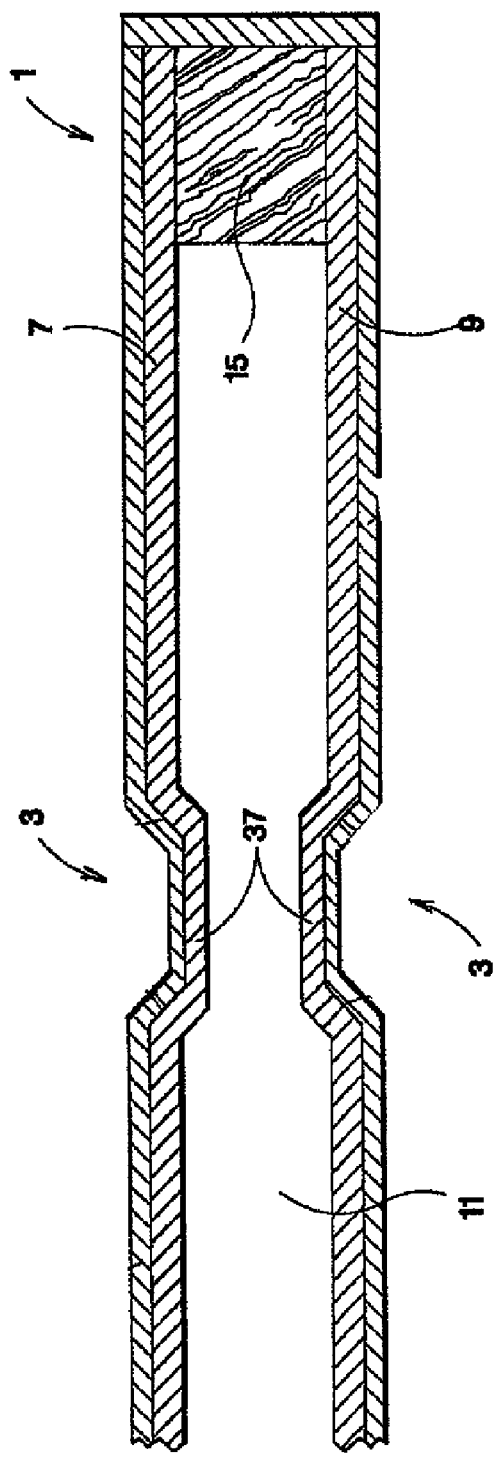
FIG. 2 is a fragmentary cross-sectional view taken along line 2-2 of FIG. 1.

As best shown in FIGS. 1 and 2, an exemplary hollow core door 1 includes molded door skins 7 and 9. The door skins 7 include three-dimensional recessed panels 3 and raised panels 5 and may be manufactured from sheet molding composition (SMC) or other suitable polymeric material. Door skins 7 and 9 of door 1 are adhesively secured to door frame 15, such as with polyvinyl acetate. Those skilled in the art will recognize that frame 15 extends about the periphery of rectangular door skins 7 and 9 and door 1, and typically includes two parallel wooden stiles extending along longitudinal edges of the door and two parallel wooden rails at the bottom and top of the door. Skins 7 and 9 are spaced apart from one another by frame 15 to form hollow core area 11 which can be filled with foam or the like. That is, the hollow core area 11 may be filled with an expanded foam insulating material defining an insulating core of the door 1, or a foam insert may be separately manufactured and disposed in the hollow core area 11 to provide sound and thermal insulation as well as providing the door 1 with the proper weight. A plastic foam or a polyurethane foam is suitable for such doors. Alternatively, the hollow core area 11 may be filled with synthetic or natural fibers. While the methods of the present invention are described below with reference to molded door skins 7 and 9 having at least one recessed panel, it should be understood that the method of reinforcing a preformed door skin can also be used to reinforce flush door skins, which have no recessed panels.

Figure 3:
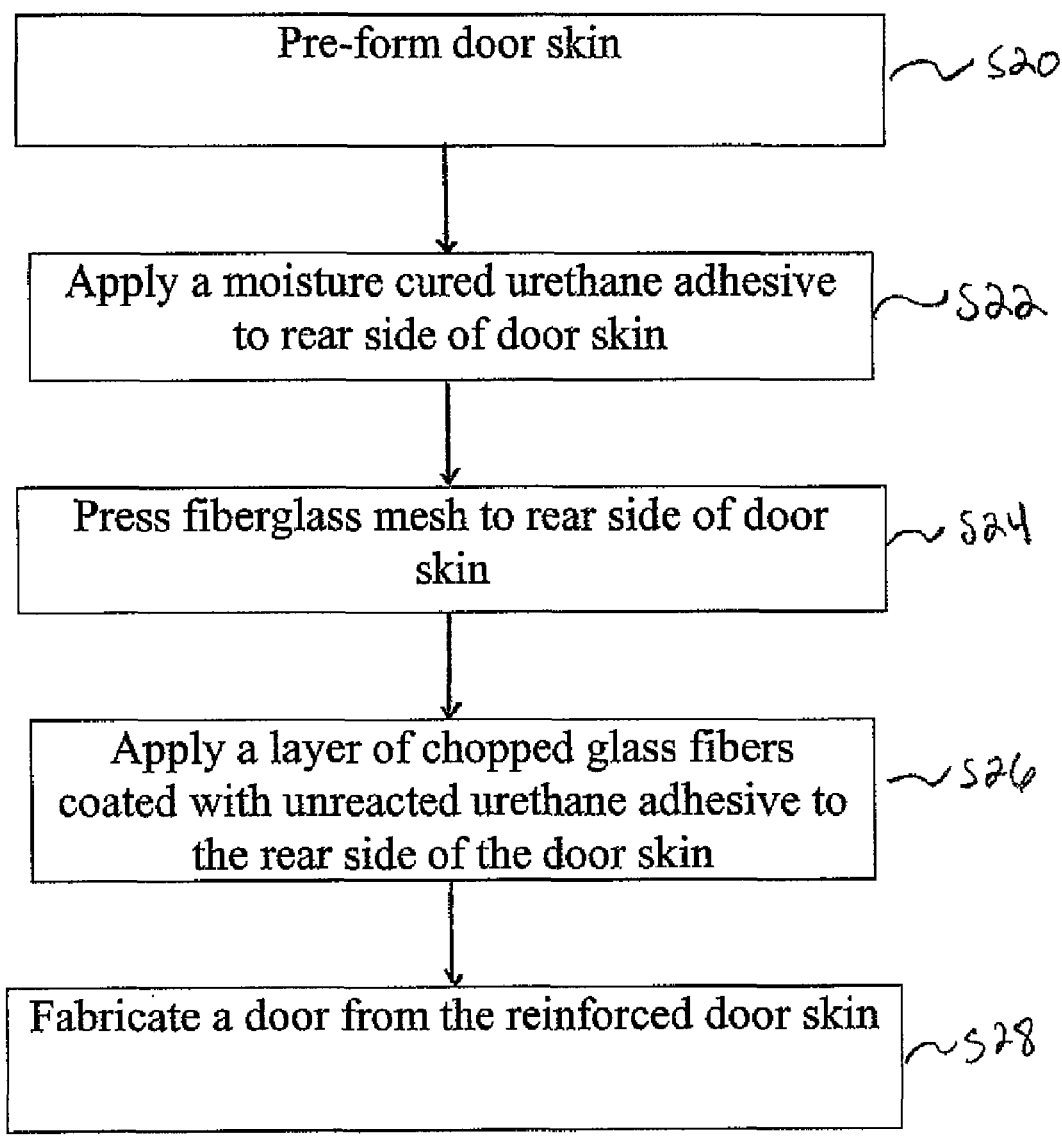
FIG. 3 is a flowchart of a method of manufacturing an impact resistant door skin from a preformed door skin, such as the door skins shown in FIGS. 1 and 2, according to an embodiment of the present invention.
Figure 4:
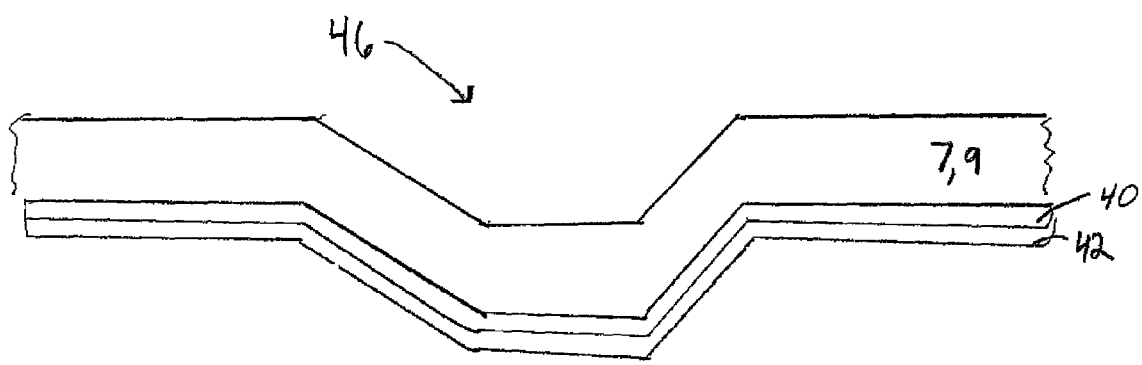
FIG. 4 is a fragmentary cross-sectional view of a molded impact resistant door skin according to another embodiment of the present invention.
Figure 5:
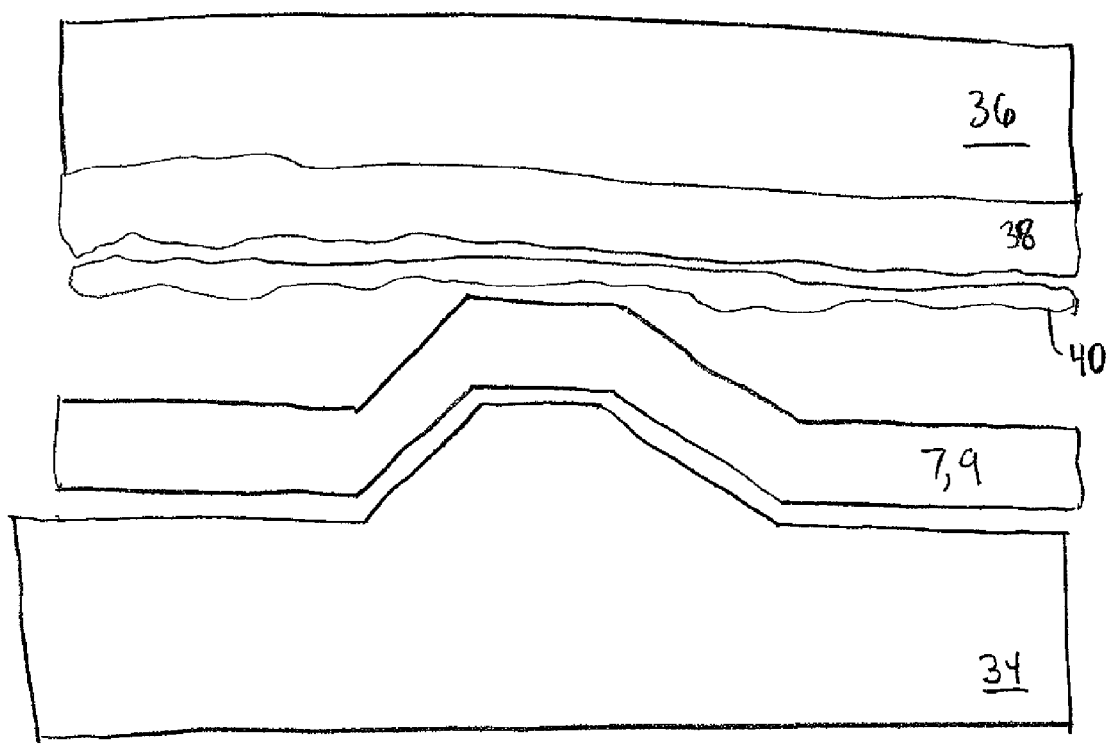
FIG. 5 is fragmentary cross-sectional view of a molded door skin being positioned in a bag press assembly in accordance with the method shown in FIG. 3.
Figure 6:
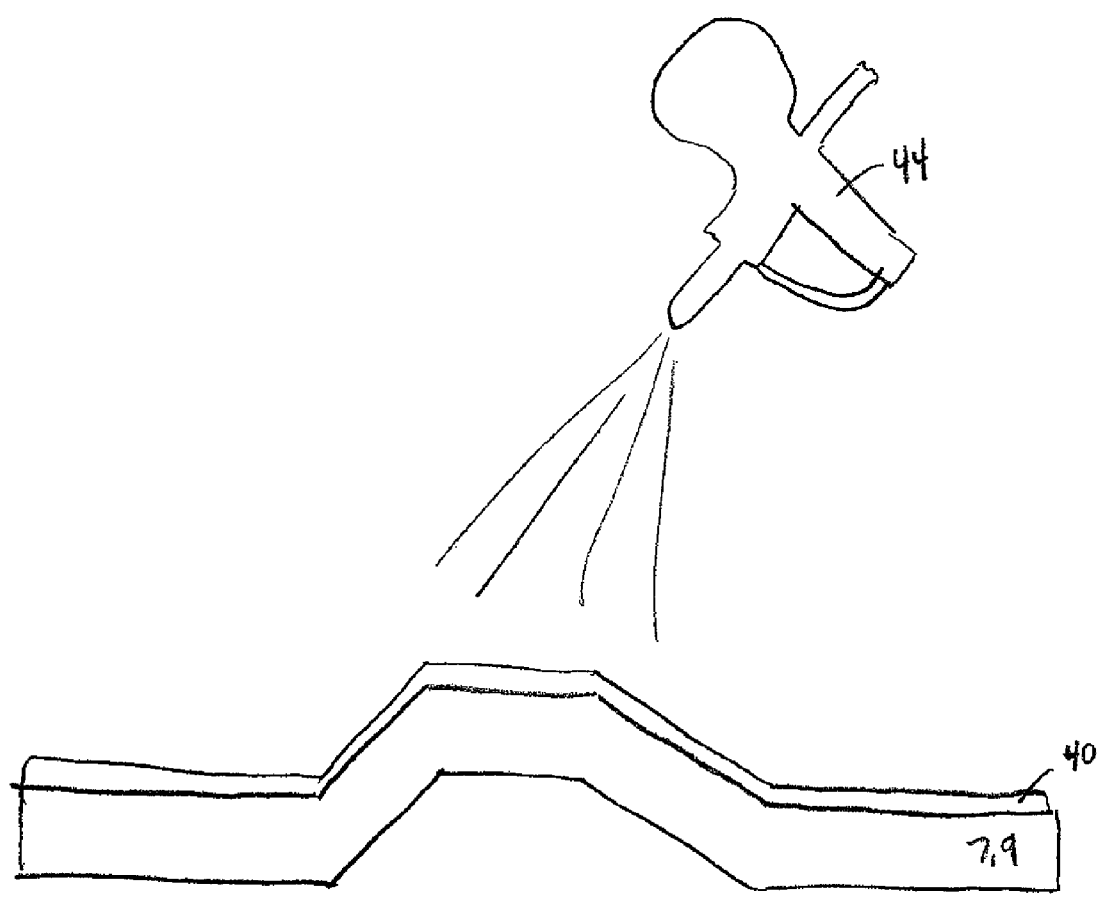
FIG. 6 is a fragmentary cross-sectional view of a molded door skin being sprayed with chopped glass fibers in accordance with the method shown in FIG. 3.

Prior to assembling the door 1, preformed molded door skins 7 and 9 may be reinforced according to the methods and processes of the present invention. As best shown in FIG. 3, the door skins 7 and 9 can be reinforced have been molded or preformed at step S20. At step S22, a urethane adhesive is applied to the rear side of the preformed door skin 7, 9. The urethane adhesive may be a one component moisture cured urethane adhesive applied to the rear side of the door skin 7, 9, such as by an adhesive roller. At step S24, a fiberglass mesh 40, best shown in FIGS. 4, 5, and 6, is applied to the rear side of the door skin 7, 9. The fiberglass mesh 40 is a continuous fine meshed fiberglass mat. In step S22, the adhesive can alternatively be applied to the fiberglass mesh 40 before it is positioned on the rear side of the preformed door skin 7, 9. The fiberglass mesh 40 is then pressed against the rear side of the door skin 7, 9 by a bag press assembly 32 at step S24, as best shown in FIG. 5.

As shown in FIG. 5, a bag press assembly 32 includes a lower platen 34 and an upper platen 36. The lower platen 34 is preferably heated. The upper platen 36 includes a membrane 38 that is inflatable to conform to the shape of the preformed door skin 7, 9. As the membrane 38 fills with air, it expands and assumes a shape complementary to that of the door skin 7, 9, thereby also causing the fiberglass mesh 40 to conform to the shape of the door skin 7, 9. Accordingly, a fiberglass mesh 40 can be adhered to the door skin 7, 9 by inflating the membrane 38, pressing the door skin 7, 9, and curing the urethane adhesive.

Because of the bag press assembly 32, the fiberglass mesh 40 can be contoured to molded door skins of various shapes, sizes, and styles. The fiberglass mesh 40 is sized to correspond to the preformed door skin 7, 9. During the pressing step, the fiberglass mesh 40 is adhered to the surface of the preformed door skin 7, 9 without affecting or changing the structural integrity of the preformed door skin 7, 9 itself. Thus, the preformed door skin 7, 9 can be manufactured using conventional methods to provide specific structural, functional, and/or aesthetic qualities to the preformed door skin 7, 9 that are maintained during the reinforcement of the door skin 7, 9. Also during the pressing step (S24), the adhesive may not be fully cured between the fiberglass mesh 40 and the preformed door skin 7, 9. When the adhesive is moisture cured adhesive, the adhesive may continue to cure due to the moisture in the air, after the pressing step is completed.

In an exemplary embodiment of the present invention, the bag press assembly 32 is heated to between 140-160 degrees Fahrenheit, pressurized to between 10 and 14 bars, and applied to the mesh 40 for 1 to 5 minutes. Alternatively, a catalyzed adhesive can be used in the pressing step (S24) to adhere the fiberglass mesh 40 to the preformed door skin 7, 9. In this case, the bag press assembly 30 can be applied to cure the adhesive at a temperature below 140 degrees Fahrenheit, for example, 120 degrees Fahrenheit. Other adhesives may also be used in this step of the process.

In an alternative embodiment of the present invention, a press assembly (not shown) having platens specifically contoured to the preformed door skin 7, 9 may be used instead of the bag press assembly 32 shown in FIG. 5.

Referring to FIG. 3, once the fiberglass mesh 40 is contoured and adhered to the door skin 7, 9, a layer 42 of chopped glass fibers coated with urethane adhesive is applied to the exposed surface of the mesh 40 to adhere to the door skin 7, 9. The layer 42 of chopped glass fibers may be applied by a chopper gun 44, which sprays the chopped glass fibers directly onto the fiberglass mesh 40, as best shown in FIG. 6. The chopped glass fibers may be uniform length or variable length.

The urethane adhesive coated to the glass fibers is preferably an unreacted two component urethane system. The two component system reacts with moisture in the air and provides a hard layer that further improves impact resistance. For example, as best shown in FIG. 6, the chopper gun 44 may be supplied with an unreacted urethane resin base and a catalyst for mixing to form the urethane based adhesive. The chopper gun 44 is also supplied with glass fiber which is coated with the urethane based adhesive. The coated glass fiber is then chopped by the chopper gun 44 and sprayed by high pressure air onto the door skin 7, 9.

The two components of the urethane system may be commercially available BASF Elastocoat S 55090R Resin as the unreacted urethane base and Elastocoat S 55090T Isocyanate as the catalyst for the reaction. The glass fiber may be commercially available PPG HYBON 6700 Glass strand applied using a Gusmer H20/35 with Probler Spray gun.

Chopper guns typically deposit chopped glass fibers randomly to form a chopped glass fiber mat held together by adhesive. Because the orientation of the reinforcing chopped glass fibers is random and non-oriented, it is difficult to deposit these chopped glass fibers in a uniform manner along a contoured or molded article, such as the preformed door skin 7, 9. Thus, it is also difficult to form a chopped glass fiber mat with a uniform weight, distribution, and strength on the preformed door skin 7, 9.

However, continuous fiberglass mesh mats are flexible and are easily conformed to non-planar shapes and molds. Thus, by applying the fiberglass mesh 40 to the rear surface of the door skin 7, 9 prior to applying the layer 42 of chopped glass fibers, the reinforcement layers 40, 42 applied to the door skin 7, 9 can be contoured more precisely and efficiently to the shape of the molded preformed door skins 7, 9. The fiberglass mesh 40 provides a base which rounds or smoothes out any sharp or dramatic contours or molding shapes so that the chopped glass fibers can be more easily uniformly deposited on the molded preformed door skin 7, 9. As a result, the reinforcement layers 40, 42, which each add a substantial degree of additional impact resistance to the door skin 7, 9, can be stably secured and uniformly applied to the preformed door skin 7, 9 so that the weight distribution, the tensile strength, and impact resistance of the door skin 7, 9 are substantially uniform throughout the door skin 7, 9.

In alternative embodiments, other types of adhesive can be used to coat the chopped glass fibers. For example, a polyurea coating may be used to coat the chopped glass fibers. It will be appreciated by one of ordinary skill in the art that various types of coatings may be used for the chopped fibers.

As best shown in FIG. 4, a molded impact resistant door skin 46 according to an embodiment of the present invention includes the preformed door skin 7, 9, the layer 40 of fiberglass mesh disposed on the rear side of the preformed door skin 7, 9, and the layer 42 of chopped glass fibers disposed on the fiberglass mesh 40.

The degrees of impact resistance added by each of the continuous fiber woven mesh layer 40 and the non-woven chopped glass layer 42 provides the door skin 46 with the ability to withstand high impact winds, debris, etc. commonly associated with hurricanes, tornadoes, and other natural disasters. A high impact resistant hollow core door according to an embodiment of the present invention may be similar to the hollow core door 1 shown in FIGS. 1 and 2, where the door skin 46 is used instead of the door skin 7, 9.

In order to manufacture the impact resistance door skin 46 and/or a door including the door skin 46, an entire plant need not be dedicated to manufacturing the door skins 46. Because the methods and processes described above can be used with any type of preformed door skin, these door skins can be made impact resistant after conventional polymeric doors skins have been manufactured. Thus, an end consumer or contractor can special order any type of door skin to be made into a high impact resistant door skin according to the embodiments of the present invention. As a result, high impact resistant doors and door skins can be made of any style and/or size of door skin efficiently, without a high degree of equipment changeover, with minimal capital, low production costs, and without accumulating a large inventory of high impact resistant hollow core doors.

The following exemplary embodiment of the invention illustrates one of the advantages of the present invention. A method of producing high impact resistant doors includes receiving purchase orders for hollow core doors selected by a customer. Some of the purchases orders are associated with a high impact resistant specification selected by the customer. The methods and processes of FIGS. 3 to 6 can be applied to door skins of the selected hollow core doors associated with the high impact resistant specification to reinforce the door skins, after the manufacturing of the door skins is complete. These methods and processes may be performed at the same manufacturing plant at which the door skins are manufactured, or they may be performed at a separate manufacturing plant dedicated to reinforcing preformed door skins according to the methods and processes described above.

Alternatively, the high impact resistant specification may be applied automatically to hollow core doors that are to be shipped to a certain geographical location(s) that is prone to high impact winds, hurricanes, tornadoes, etc. In this case, the manufactured door skins for hollow core doors would be automatically reinforced.

The reinforcement of the door skins of the hollow core doors associated with the purchase orders may be selected/controlled as described above using computer software for generating purchase orders.

It should be understood that although the embodiments of the invention have been described above with reference to making door skins high impact resistant, the methods and processes of the present invention can alternatively be used to make other building components high impact resistant. For example, a fiberglass mesh can be applied to a contoured or molded building component using a press in a similar manner as set forth above. Then a chopper gun may be used to spray chopped glass fibers onto the fiberglass mesh so as to make the contoured building component resistant to high impacts.

Although a few embodiments of the present invention have been shown and described, it will be appreciated by those skilled in the art that changes may be made in these embodiments without departing from the principles and spirit of the invention, the scope of which is defined in the appended claims and their equivalents.

We claim:

1. An impact resistant door, comprising:
a peripheral frame; and
first and second door skins secured to opposing sides of said frame, at least one of said skins comprising a premolded polymeric material comprising front and rear opposing major surfaces, a fiberglass woven mesh mat adhered to the rear major surface of at least one skin, and a layer of non-woven and randomly oriented chopped glass fibers adhesively secured to said fiberglass woven mesh mat.

2. The impact resistant door of claim 1, wherein said woven mesh mat is secured to said rear major surface with a moisture curable adhesive.

3. The impact resistant door of claim 2, wherein said fibers are adhered to said woven mesh mat with a two component urethane adhesive.

4. The impact resistant door of claim 3, wherein said door skins are formed from said preformed polymeric material, said at least one skin having a panel molded therein.

5. The impact resistant door of claim 4, wherein said woven mesh mat conforms to said rear major surface.

6. The impact resistant door of claim 4, wherein said woven mesh mat is adhered to only one of said door skins.

* * * * *